United States Patent
Beauregard

(10) Patent No.: US 10,493,925 B2
(45) Date of Patent: Dec. 3, 2019

(54) VEHICLE SEAT COMPRISING A DISPLAY DEVICE

(71) Applicant: FAURECIA INTERIEUR INDUSTRIE, Nanterre (FR)

(72) Inventor: Julien Beauregard, Mesnil en Thelle (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 15/987,422

(22) Filed: May 23, 2018

(65) Prior Publication Data

US 2018/0339663 A1    Nov. 29, 2018

(30) Foreign Application Priority Data

May 24, 2017   (FR) ..................... 17 54593

(51) Int. Cl.
*B60R 11/02*     (2006.01)
*B60R 11/00*     (2006.01)
(Continued)

(52) U.S. Cl.
CPC ............ *B60R 11/0229* (2013.01); *B60N 2/14* (2013.01); *B60N 2/797* (2018.02); *B60N 2/986* (2018.02);
(Continued)

(58) Field of Classification Search
CPC ... A47C 7/723; A47C 7/72; B60R 2011/0082; B60R 11/0229; B60R 11/0241; B60R 2011/0045; B60R 11/0235; B60R 2011/0012; B60N 2/986; B60N 2/14; B60N 2/797
(Continued)

(56) References Cited

U.S. PATENT DOCUMENTS 6,039,141 A * 3/2000 Denny .................. B60N 2/797
                                                       180/329
6,997,494 B2 * 2/2006 Neumann ............... B60R 11/02
                                                       296/1.09
(Continued)

FOREIGN PATENT DOCUMENTS

DE     202004020430 U1    7/2005
FR        2892678 A1 *    5/2007 ............. B60K 35/00
(Continued)

OTHER PUBLICATIONS

French Search Report for application No. FR 1754593, dated Feb. 9, 2018, 2 pages.

*Primary Examiner* — Milton Nelson, Jr.
(74) *Attorney, Agent, or Firm* — Reising Ethington P.C.

(57) ABSTRACT

A vehicle seat having a seat bottom, a seat back, and at least one display device. The seat bottom defines at least one bearing surface for an occupant of the seat, and the display device includes a display area. The display device is movable relative to the seat bottom between a retracted position, in which the surface of the display area visible from outside the seat bottom is small or nonexistent, and at least one extended position, in which the surface of the display area visible from outside the seat bottom protrudes from the bearing surface and has a surface larger than the surface of the display area visible in the retracted position.

10 Claims, 2 Drawing Sheets

(51) Int. Cl.
  *B60N 2/14* (2006.01)
  *B60N 2/90* (2018.01)
  *B60N 2/75* (2018.01)

(52) U.S. Cl.
  CPC ... *B60R 11/0241* (2013.01); *B60R 2011/0012* (2013.01); *B60R 2011/0045* (2013.01); *B60R 2011/0082* (2013.01)

(58) Field of Classification Search
  USPC .................................................. 297/217.4
  See application file for complete search history.

(56) References Cited

U.S. PATENT DOCUMENTS 9,079,540 B2 * 7/2015 Harding .................. B60R 11/02
2017/0015217 A1   1/2017 Pike et al.

FOREIGN PATENT DOCUMENTS

JP      63175457 U     11/1998
WO   WO2005025986 A1   3/2005

* cited by examiner

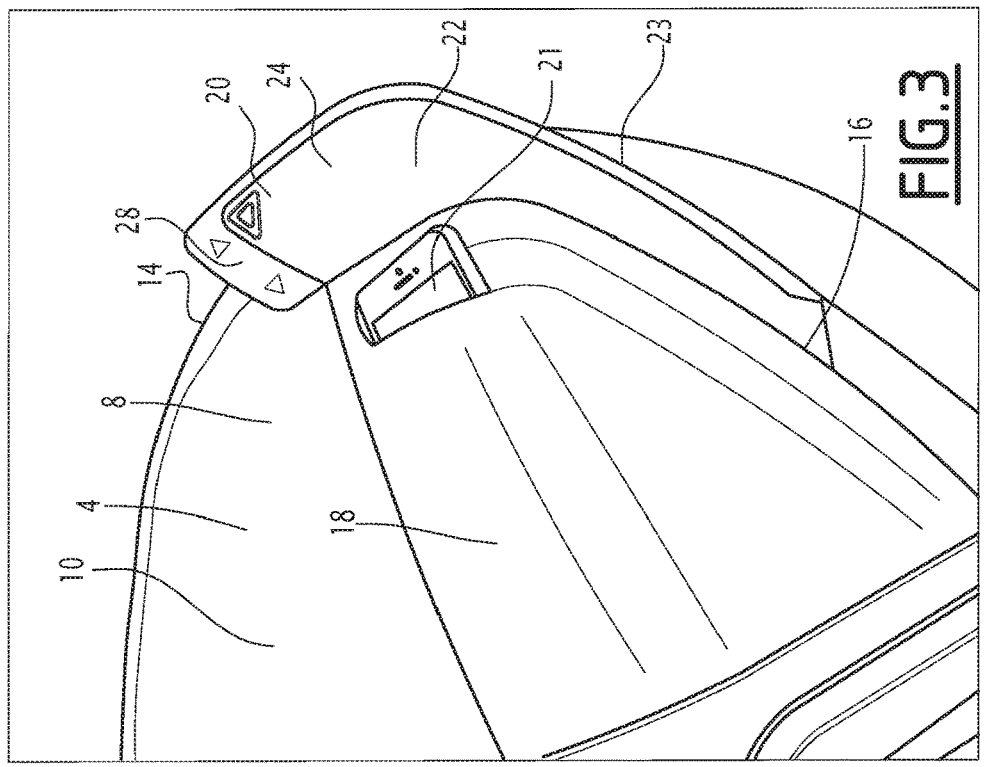
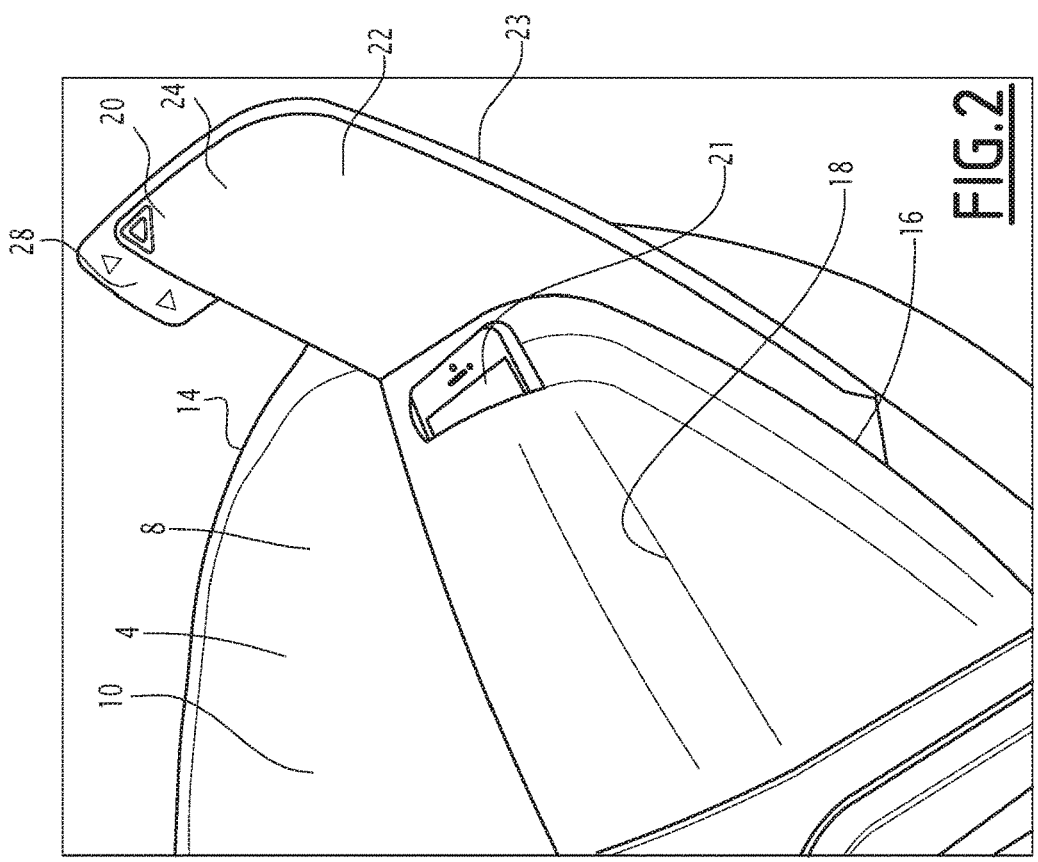

VEHICLE SEAT COMPRISING A DISPLAY DEVICE

TECHNICAL FIELD

The present invention relates to a vehicle seat, of the type comprising a seat bottom and a seat back, the seat bottom defining at least one bearing surface for an occupant of the seat, and at least one display device, defining a display area.

The invention also relates to a vehicle comprising at least one such seat. The invention for example applies to a motor vehicle.

BACKGROUND

In the context of so-called "autonomous" vehicles, in which driver intervention is reduced, or even practically nonexistent, to drive the vehicle, the arrangement of the passenger compartment may be configurable by modifying the orientation and/or the position of the seats, since they no longer necessarily need to face the road. It is thus for example possible to provide for turning the seats toward one another and/or placing the seats in elongated, more comfortable positions for the vehicle's passengers. In this case, since all of the passengers are not looking in the same direction, it may be advantageous for each seat to be equipped with a display device allowing the occupant of the seat to have information on the driving of the vehicle or its geolocation, and optionally to control certain functions of the vehicle, in the case of a display device made up of a touch-sensitive screen.

However, the position and the visibility of such a display device are not suitable for all positions and/or orientations of the seat, which makes the display device impractical to use, or even bothersome, in certain positions and/or orientations of the seat. For example, when a driver must intervene in the driving of the vehicle, for example in a manual driving configuration of the vehicle, the driver must not be disrupted by the presence of a display device and by the information displayed thereon, which may distract him during driving.

SUMMARY

One aim of the invention is to offset these drawbacks by proposing a seat equipped with a display device suitable for all positions and/or orientations of the seat in the passenger compartment of a vehicle.

To that end, the invention relates to a display device that is movable relative to the seat bottom between a retracted position, in which the surface of the display area visible from outside the seat bottom is small or nonexistent, and at least one extended position, in which the surface of the display area visible from outside the seat bottom protrudes from the bearing surface and has a surface larger than the surface of the display area visible in the retracted position.

By making the display movable relative to the seat bottom, the position and the visibility of the display area can be adapted to the position of the occupant of the seat and/or the position of the seat in the passenger compartment. Thus, as an example, when the driver's seat is in a driving position, the display device can be placed in a retracted position so as not to bother the driver, while the display device is placed in an extended position when the seat is placed in an elongated position. According to another example, the display device is placed in the retracted position when the seat is moved in the passenger compartment, for example when the seat pivots, so as not to interfere with other elements extending in the passenger compartment of the vehicle during this movement.

According to other embodiments of the invention the seat may have any of the following features considered alone or according to any technically possible combination:
- the seat bottom comprises at least one seat bottom element defining a surface for receiving an occupant of the seat forming a bearing surface of the seat bottom, the display area extending mainly in the seat bottom element in the retracted position and mainly outside the seat bottom element in an extended position;
- the seat bottom comprises at least one armrest element defining a bearing surface for a user's elbow, the display area extending mainly in the armrest element in the retracted position and mainly outside the armrest element in an extended position;
- the display device moves in translation between the retracted position and the extended position;
- the seat bottom extends between a rear edge, extending near the seat back, and a front edge, opposite the rear edge, and between two side edges each joining the rear edge to the front edge, the display device extending along one of said side edges and near the front edge;
- the display device is a touch-sensitive screen making it possible to control at least one function by contact with said screen;
- the display device is movable in a plurality of extended positions, in which the visible surface of the display area is larger or smaller; and
- the seat back and/or the seat bottom are movable so as to modify their position and/or their orientation, the movement of the display device being coupled with the movement of the seat back and/or the seat bottom.

The invention also relates to a vehicle comprising a vehicle body comprising a floor, partially defining the inside of the passenger compartment of the vehicle, and at least one seat as defined above extending over the floor in the passenger compartment of the vehicle, said seat being movable relative to the body of the vehicle.

According to other features of the vehicle according to the invention, the seat is at least rotatable around an axis substantially perpendicular to the floor so as to modify the orientation of the seat relative to the passenger compartment, the display device being arranged to be in the retracted position during the rotational movement of the seat around the axis.

BRIEF DESCRIPTION OF THE DRAWINGS

Other aspects and advantages of the invention will appear upon reading the following description, provided as an example, and done in reference to the appended drawings, in which:

FIG. 2 is a schematic perspective illustration of part of the seat of FIG. 1, the display device being in an extended position, and FIG. 3 is a schematic perspective illustration of the part of the seat of FIG. 2, the display device being in a retracted position.

DETAILED DESCRIPTION OF THE ILLUSTRATED EMBODIMENT

Figure 1:
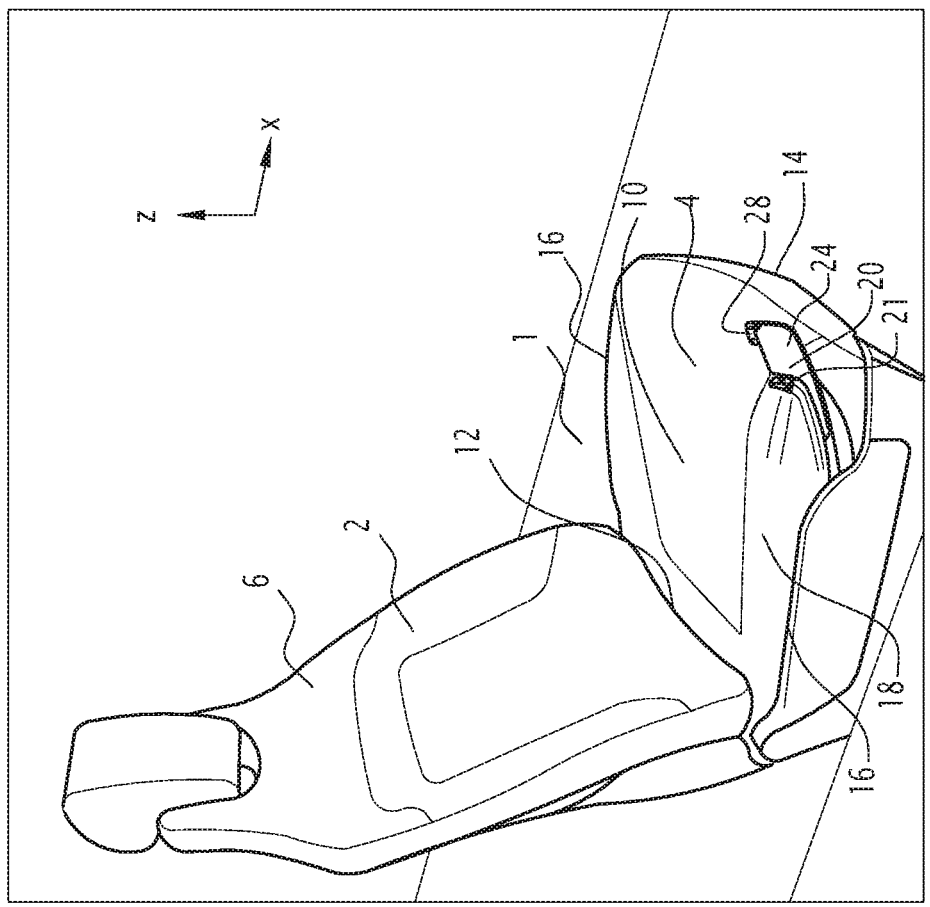
FIG. 1 is a schematic perspective illustration of a vehicle seat according to an embodiment of the invention positioned on a vehicle floor.

In reference to FIG. 1, a vehicle is shown comprising a vehicle body defining a passenger compartment arranged to receive one or several passengers of the vehicle. The vehicle is for example a motor vehicle. It is, however, understood that the invention applies to any type of vehicle and any type of seats in the vehicle.

The passenger compartment is partly defined by a floor 1 extending substantially and at least partly in a plane defined by a longitudinal direction X, corresponding to the front-back direction of the vehicle, and a transverse direction, corresponding to the width of the vehicle. The passenger compartment extends above the floor 1 in an elevation direction Z, corresponding to the height of the vehicle.

The vehicle comprises at least one seat 2 mounted on the floor 1. The seat 2 traditionally comprises a seat bottom 4, on which a passenger is intended to be seated, and a seat back 6, against which the passenger's back can rest. The position of the seat 2 is adjustable so as to modify its position in the passenger compartment, for example to move it farther away from or closer to a dashboard of the vehicle. To that end and as is known in itself, the seat bottom 4 of the seat 2 is for example mounted translatably on rails secured to the floor of the vehicle and extending in the longitudinal direction X. Thus, the entire seat can be moved in the longitudinal direction by adjusting the position of the seat bottom 4 relative to the rails. Also traditionally, the incline of the seat bottom 4 and/or the seat back 6 is adjustable. Thus, the angle between the seat bottom 4 and the longitudinal direction X and/or the angle between the seat back 6 and the elevation direction Z of the vehicle are adjustable so as to vary the incline of the seat as desired by the passenger. According to one embodiment, the incline of the seat bottom 4 and the seat back 6 can be adjusted independently of each other according to one operating mode and in a synchronized manner according to another operating mode. Thus, the user can adjust the incline of the seat bottom 4, the seat back 6, respectively, without altering that of the seat back 6, that of the seat bottom 4, respectively, according to one operating mode. According to another operating mode, the change of the incline of the seat bottom 4, the seat back 6, respectively, causes a corresponding change in the seat back 6, the seat bottom 4, respectively.

According to one embodiment, the seat 2 is further mounted pivoting relative to the floor 2 in order to make it possible to orient the seat 2 relative to the other seats of the vehicle. Thus, the seat 2 can for example face the other seats, during an autonomous driving phase of the vehicle, in which the driver does not intervene, and be turned toward the windshield in a manual driving phase. To that end, the seat 2 is for example mounted rotating around an axis A substantially perpendicular to the floor 1, i.e., extending the elevation direction Z.

Thus, the position and the orientation of the seat 2, of its seat bottom 4 and of its seat back 6 are configurable in the passenger compartment of the vehicle.

The seat bottom 4 defines at least one bearing surface for an occupant of the seat.

The seat bottom 4 of the seat 2 comprises at least one seat bottom element 8, for example comprising a cushion covered by a lining covering. The seat bottom element 8 defines a receiving surface 10, forming a bearing surface of the seat bottom, intended to receive the occupant of the seat, i.e., on which the occupant is seated when installed on the seat 2.

The seat bottom 4 is defined by a rear edge 12, a front edge 14 and two side edges 16. The rear edge 12 extends near the seat back 6 and the front edge 14 forms the free edge of the seat bottom 4 opposite the rear edge 12. Thus, when an occupant is seated on the seat 2, his back is pressed against the seat back 6 near the rear edge 12, his thighs are on the receiving surface 10 and his knees are outside the receiving surface 10 near the front edge 12. The side edges 16 extend between the rear edge 12 and the front edge 14 on either side of the receiving surface 10.

According to the embodiment shown in the figures, the seat bottom 4 further comprises an armrest element 18 extending along one of the side edges 16 over the receiving surface 10 and defining a bearing surface of the seat bottom 4 for a user's elbow.

The seat bottom 4 further comprises a display device 20 defining a display area 22 capable of displaying information relative to the vehicle and/or at least one device 21 coupled to the display device 20. The display device 20 can further be a touch-sensitive screen, i.e., a screen making it possible to control one or several functions related to the vehicle or the device connected to the display device 20. To that end, the display area 22 is for example covered with a capacitive film connected to a control device of the vehicle, or any other means allowing a user to interact with the display area 22 by touching it and/or by bringing his finger close to it. Thus, the user can interact with the display device 20 to control one or several functions of the vehicle, for example to control the air conditioning system and/or the sound system and/or to change the display of the display area 22. The coupling of a device 21, for example a mobile electronic device, such as a mobile phone or smartphone or the like, can be done using any known means, by a wireless link or the like.

According to the embodiment shown in the figures, the display device 20 extends along a side edge 16 near the front edge 14 such that the display area 22 faces toward and is visible by the occupant of the seat 2. Furthermore, in this location, the touch-sensitive functions of the display device 20 are easily accessible to the occupant of the seat, since his hand is positioned near the display device 20 when he is seated on the seat 2. According to one embodiment, the display device 20 is for example located between the front edge 14 and the front of the armrest element 18, which makes it particularly accessible when the occupant of the seat 2 rests his arm on the bearing surface formed by the armrest element 18.

The display device 20 can be provided with a border 23 extending around at least part of the display area 22. The border 23 can be arranged to make part of the side edge 16 along which the display device 20 extends aesthetically pleasing while forming an interface between the armrest element 18 and the cushion of the seat bottom element 8.

The display device is mounted to be movable relative to the seat bottom 4 between a retracted position, in which the visible surface of the display area 22 is small or nonexistent, and at least one extended position, in which the visible surface of the display area 22 is increased and larger than the visible surface of the display area 22 in the retracted position. Visible surface refers to the part of the display area 22 that is visible from outside the seat 2, in particular by the person seated on the seat 2.

Thus, in the retracted position, the display area 22 is mainly hidden, i.e., the majority, or even all, of the display area 22 is not visible from outside the seat 2, as shown in FIG. 3. As an example, in the retracted position, only an upper part 24 of the display area 22 is visible, which makes it possible to display a smaller quantity of information, such as control icons for certain functions, timestamp information, etc.

According to one embodiment, the hidden part of the display area 22 extends in the seat bottom element 8. For example, in this embodiment, the hidden part of the display area 22 extends in a part of the seat bottom element 8 extending below the armrest element 18, i.e., a part of the seat bottom element 8 that is not visible from outside the seat bottom 4.

According to another embodiment, the hidden part of the display area 22 extends in the armrest element 18.

In an extreme extended position, as shown in FIGS. 1 and 2, the display area 22 is mainly visible, i.e., the majority, or even all, of the display area 22 extends outside the seat bottom 4 so as to be visible, in particular by the passenger seated on the seat 2. In this position, a larger quantity of information can be displayed in the display area. For example, in this position, geolocation information, audiovisual content or the like can be displayed in the display area 22 in the extended position, while remaining readable by the passenger seated on the seat 2.

The visible surface of the display area 22 protrudes from at least one of the bearing surfaces of the seat bottom 4. Thus, the visible surface of the display area 22 protrudes from the receiving surface 10 of the seat bottom element 8 and/or the bearing surface of the bearing surface of the armrest element 18, and faces the seat back 6 so as to be visible and accessible for the occupant of the seat 2. The visible surface of the display area for example extends in a plane comprising the elevation direction or a direction slightly inclined relative to the elevation direction in order to improve the visibility of the display area 22 by the occupant of the seat 2.

According to one embodiment, several extended positions can be adopted by the display device 20 in which the visible surface of the display area 22 is larger or smaller. For example, it is possible to provide:
  a retracted position in which the display device 22 extends completely in the seat bottom element 8 or in the armrest element 18 such that the visible surface of the display area 22 is null in the retracted position,
  a first extended position, in which only an upper part 24 of the display area 22 is visible, as previously described, and
  a second extended position, in which the entire display area 22 is visible, as previously described.

Thus, the display proposed by the display device 20 is configurable and can be adapted based on the type of information to be displayed and/or based on the position of the seat, as will be described later.

The movement between the retracted and extended positions is for example a translational movement in a direction substantially parallel to the plane in which the display area 22 extends, as shown in FIGS. 2 and 3. According to one embodiment, the display area 22 can be slightly curved with a concave side turned toward the seat back 8 so as to improve the visibility of the display area 22 by the occupant of the seat. In this case, the movement between the retracted and extended positions is a sliding along a curved trajectory corresponding to the curvature of the display area 22, which imparts a pleasing aesthetic to the movement kinematics of the display device 20.

The movement of the display device 20 is for example controlled by a control device 28 accessible to the occupant of the seat in all positions of the display device 20. The control device 28 for example extends over an edge of the display device on a side of the display device and is integrated into the border 23. According to the embodiment shown in the figures, the actuating device 28 is adjacent to the upper part 24 of the display area 22. The actuating device is for example actuated by a touch-sensitive surface making it possible to move the display device 20 from the retracted position to an extended position or from an extended position to the retracted position based on the part of the touch-sensitive surface on which the user presses his finger. The control device 28 could also be positioned in another location of the seat 2 of the vehicle and not be directly adjacent to the display area 22. Thus, the user can choose the position of the display device 20 based on what he wishes to be able to see in the display area 22.

The movement of the display device 20 can also or alternatively be coupled with that of the seat 4 so that the position of the display device 20 automatically adapts to that of the seat or so that the display device 20 moves automatically into a certain position under certain usage conditions of the vehicle. Thus, the movement of the display device 20 can be coupled with the movement of the seat bottom 4 and/or the seat back 6 when the position and/or the orientation of the seat bottom 4 and/or the seat back 6 are modified.

For example, it is possible to provide that the display device 20 moves into the second extended position, or extreme extended position, when the seat is placed in an elongated position, in which the angle formed between the axis of the seat back and the axis of the seat bottom is large, corresponding to an elongated position of the occupant of the seat. Thus, in this position, the occupant of the seat can see the display area 22 without having to adopt an uncomfortable position.

According to one particularly advantageous embodiment, the display device 20 is arranged to go to the retracted position automatically when the seat 2 pivots around the axis A. Thus, the display device 20 is prevented from interfering with the display device 20 of an adjacent seat 2 when the seats pivot for example to place the passengers across from one another. Likewise, the display device can also be arranged to enter the retracted position automatically when an impact against the vehicle is detected, such that the display device 20 does not form a hard obstacle in the passenger compartment of the vehicle capable of injuring the passengers. It is also possible to provide that the display device 20 of a driver's seat is placed in the retracted position during a manual driving phase of the vehicle so that the display area does not distract the driver from driving the vehicle.

The seat described above makes it possible to incorporate, ergonomically and aesthetically pleasingly, an individual display device intended for the occupant of the seat. All or some of the seats of a vehicle may be equipped with such a display device, the movements of which can be synchronized differently from those of the seat based on the position of the seat in the vehicle.

The invention claimed is:

1. A vehicle seat comprising a seat bottom and a seat back, the seat bottom defining at least one bearing surface for an occupant of the seat, and at least one display device, defining a display area, wherein the display device is movable relative to the seat bottom between a retracted position, in which the surface of the display area visible from outside the seat bottom is small or nonexistent, and at least one extended position, in which the surface of the display area visible from outside the seat bottom protrudes from the bearing surface and has a surface larger than the surface of the display area visible in the retracted position,
  wherein the display device is movable to a plurality of extended positions, in which the visible surface of the display area is larger or smaller, each of the extended positions being a position at which the display device remains until actuated to move to a different one of the positions.

2. The vehicle seat according to claim 1, wherein the seat bottom comprises at least one seat bottom element defining a surface for receiving an occupant of the seat forming a bearing surface of the seat bottom, the display area extending mainly in the seat bottom element in the retracted position and mainly outside the seat bottom element in the extended position.

3. The vehicle seat according to claim 1, wherein the seat bottom comprises at least one armrest element defining a bearing surface for a user's elbow, the display area extending mainly in the armrest element in the retracted position and mainly outside the armrest element in the extended position.

4. The vehicle seat according to claim 1, wherein the display device moves in translation between the retracted position and the extended position.

5. The vehicle seat according to claim 1, wherein the seat bottom extends between a rear edge, extending near the seat back, and a front edge, opposite the rear edge, and between two side edges each joining the rear edge to the front edge, the display device extending along one of said side edges and near the front edge.

6. The vehicle seat according to claim 1, wherein the display device is a touch-sensitive screen making it possible to control at least one function by contact with said screen.

7. A vehicle comprising a vehicle body comprising a floor, partially defining the inside of the passenger compartment of the vehicle, and at least one seat according to claim 1, extending over the floor in the passenger compartment of the vehicle, said seat being movable relative to the body of the vehicle.

8. The vehicle according to claim 7, wherein the seat is at least rotatable around an axis substantially perpendicular to the floor so as to modify the orientation of the seat relative to the passenger compartment, the display device being arranged to be in the retracted position during the rotational movement of the seat around the axis.

9. A vehicle seat, comprising:
a seat bottom and a seat back, the seat bottom comprising a bearing surface for an occupant of the seat; and
a display device having a display area and being moveable relative to the seat bottom between a retracted position, in which a majority of the display area is not visible from outside the seat bottom, and a plurality of extended positions, in which a visible portion of the display area protrudes from the bearing surface,
wherein the visible portion of the display area is larger in one of the extended positions than in another one of the extended positions and more of the display area is visible in each of the extended positions than in the retracted position, and
wherein each extended position is a distinct operating position to which the display device can be moved from another extended position.

10. The vehicle seat according to claim 9, wherein substantially the entire display area is not visible from outside the seat bottom in the retracted position, only a portion of the display area is visible from outside the seat bottom in one of the extended positions, and the entire display area is visible from outside the seat bottom in another one of the extended positions.

* * * * *